(12) United States Patent
Katou (10) Patent No.: US 8,391,931 B2
(45) Date of Patent: Mar. 5, 2013

(54) MOBILE COMMUNICATION TERMINAL AND COMMUNICATION METHOD

(75) Inventor: Kenichi Katou, Tokyo (JP)

(73) Assignee: NEC Corporation, Tokyo (JP)

( * ) Notice: Subject to any disclaimer, the term of this patent is extended or adjusted under 35 U.S.C. 154(b) by 938 days.

(21) Appl. No.: 12/161,535

(22) PCT Filed: Feb. 6, 2007

(86) PCT No.: PCT/JP2007/051966
§ 371 (c)(1),
(2), (4) Date: Jul. 18, 2008

(87) PCT Pub. No.: WO2007/091533
PCT Pub. Date: Aug. 16, 2007

(65) Prior Publication Data
US 2010/0227654 A1  Sep. 9, 2010

(30) Foreign Application Priority Data
Feb. 8, 2006 (JP) .................... 2006-030564

(51) Int. Cl.
*H04B 1/38* (2006.01)
*G11C 5/14* (2006.01)
(52) U.S. Cl. ...................... 455/574; 365/227
(58) Field of Classification Search .............. 455/574; 709/115, 116; 365/189.17, 189.2, 227
See application file for complete search history.

(56) References Cited

U.S. PATENT DOCUMENTS

| 7,251,500 B2 * | 7/2007 | Nakagawa et al. ......... 455/556.1 |
| 7,657,257 B2 * | 2/2010 | Cricco et al. .................. 455/419 |
| 2004/0185820 A1 | 9/2004 | Ogura |
| 2004/0261072 A1 | 12/2004 | Herle |
| 2005/0245227 A1 * | 11/2005 | Nohno et al. ............... 455/343.5 |
| 2006/0065746 A1 * | 3/2006 | Hakushi et al. ............... 235/492 |

FOREIGN PATENT DOCUMENTS

| EP | 1530296 A | 5/2005 |
| JP | 2002222116 A | 8/2002 |
| JP | 2002368676 A | 12/2002 |
| JP | 2003188798 A | 7/2003 |
| JP | 2003196097 A | 7/2003 |
| JP | 2004134904 A | 4/2004 |
| JP | 2004147061 A | 5/2004 |
| JP | 2004159177 A | 6/2004 |

OTHER PUBLICATIONS

Supplementary European Search Report for EP 07 70 8084 completed Dec. 2, 2009.
International Search Report for PCT/JP2007/051966 mailed Mar. 6, 2007.
International Preliminary Report on Patentability for PCT/JP2007/051966 issued Aug. 12, 2008.
Japanese Office Action for JP2007-557836 issued Aug. 3, 2011.

* cited by examiner

*Primary Examiner* — Kent Chang
*Assistant Examiner* — Scott Au

(57) ABSTRACT

A mobile communication terminal and a communication method are provided which can reduce consumed power at the time of intermittent reception operation. The mobile communication terminal according to the present invention includes a RAM, an internal memory operable in a higher speed then the RAM, an arithmetic processing unit for performing a communication operation by using a communication program loaded in the RAM, an intermittent control unit, and a storage unit for storing an intermittent operation program. The intermittent control unit transfers the intermittent operation program stored in the storage unit to the internal memory in response to an intermittent operation start signal issued from the communication arithmetic processing unit. The communication arithmetic processing unit stops the communication operation when the transfer is completed and performs the intermittent reception operation by using the intermittent operation program stored in the internal memory.

12 Claims, 9 Drawing Sheets

Fig. 9

MOBILE COMMUNICATION TERMINAL AND COMMUNICATION METHOD

TECHNICAL FIELD

The present invention relates to a mobile communication terminal and a communication method, more specifically, to a mobile communication terminal and a communication method, in which a normal receiving operation and an intermittent receiving operation are switched for a communication operation.

BACKGROUND ART

In recent years, improvement the processing capability of a mobile phone is demanded as a result of improvement of communication quality and advanced multiple functions such as the execution environment of Web browser and Java (registered trademark), and installation of a CCD camera and a video telephone function. Accordingly, the mobile phone has been developed in which twin CPUs are mounted to have specialized purposes such as a CPU for a communication process relating to audio communication (i.e. baseband chip) and a CPU for application processes. The twin CPUs are regarded as an important technique particularly in third and following generations of mobile phones on which various high functional applications are installed and which require higher speed communication. In third-generation mobile phones which require multimedia functions as represented by a video telephone function, a large burden will be generated if a baseband chip executes a video image process. In such a case, it is desirable to mount a CPU exclusively used for an application from viewpoint of flexibility.

In a currently developed mobile terminal with twin CPUs mounted, a process to be executed by each of the CPUs is different depending on the terminal. For example, there is a mobile phone with twin CPUs mounted, in which an application one of the CPUs is used to carry out an operation which requires high-speed processes such as a video image process and a Java (registered trademark) process while basic software is operated on a baseband chip side in the same manner as conventional techniques. However, in this case, problems arise such that specification changes of applications and a communication system affect other software and an application portion cannot be formed before completion of the communication system.

Moreover, in the mobile phone industry under fierce development competition, it is a large burden for manufacturers to develop twin CPUs for every new model. In order to solve such problems, the mobile phones with twin CPUs mounted which are highly independent from each other have been developed in recent years, in which the baseband chip side is used exclusively for communication processes and an application CPU is used to execute other application functions (such as a telephone book function, Java (registered trademark) function, video image reproduction function, and a voice process function). By completely dividing the system into a communication system and an application system, parallel development of the application CPU and the communication CPU becomes possible, to improve development efficiency. As a result, manufacturers can reduce development costs and a development period.

Meanwhile, function fulfillment and extension of waiting time are considered to be important in mobile communication terminals as represented by the current mobile phones. Accordingly, it has been started to employ an intermittent reception function in a wide range for the purpose of lowering power consumption at the waiting time. The intermittent reception is a technique to repeat a reception state (or a wakeup mode) and a low power state (or a sleep mode) for a predetermined period so as to receive a signal from other communication apparatus only in the wakeup mode and stop receiving the signal in the sleep mode. Following techniques are disclosed as related art relating to the intermittent reception.

Japanese Patent Application Publication (JP-P2002-368676A) describes an intermittent reception method for reducing consumed power by operating a system clock generating section at a time of a normal operation and stopping the system clock generating section in a sleep state.

Japanese Patent Application Publication (JP-P2003-196097A) describes a technique, in which table data saved in a backup memory when a power source of an intermittent operation is turned on is loaded into a table data storage section, thereby a period of time to read data from a boot ROM can be shortened by the intermittent operation.

Japanese Patent Application Publication (JP-P2004-134904A) describes a technique to reduce consumed power by setting a time period in a intermittent reception state to be doubled if there is no incoming call during a preset reception interval time or more and a reception level is not equal to or more than a preset specified value.

Figure 9:
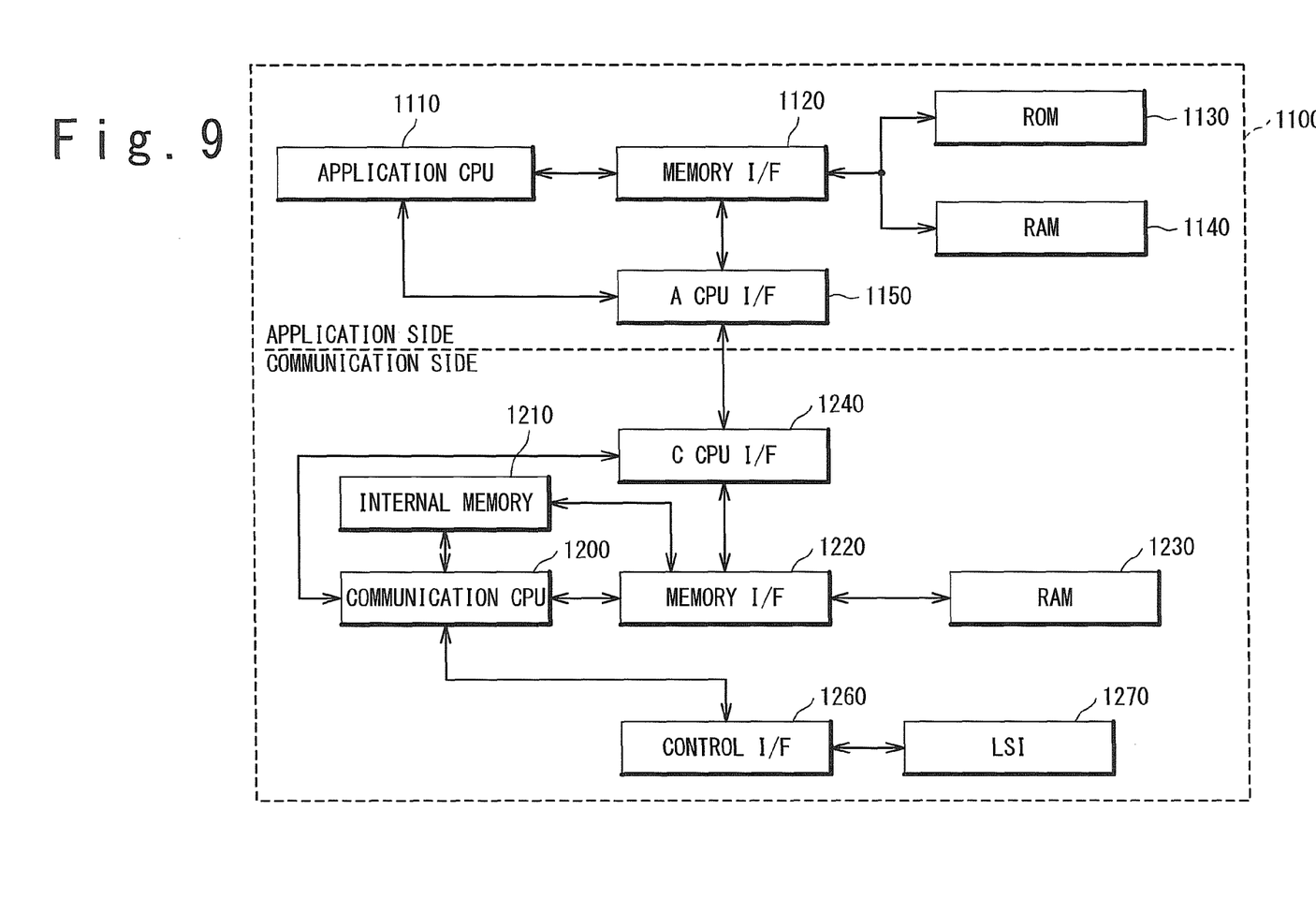
FIG. 9 is a block diagram showing a configuration of a related-art mobile communication terminal.

FIG. 9 is a block diagram showing a configuration of a mobile communication terminal 1100 (e.g. mobile phone) using twin CPUs in a related art. Referring to FIG. 9, a method to use a program for performing an intermittent receiving operation (to be referred to as a program for the intermittent operation hereinafter) in the mobile communication terminal 1100 will be described.

The related-art mobile communication terminal 1100 includes an application side chip for executing various application processes except for communication processes, and a communication side chip for executing communication processes. The application side chip is provided with an application CPU 1110, a memory interface (I/F) 1120, a ROM 1130, a RAM 1140, an ACPU interface (I/F) 1150. The communication side chip is also provided with a communication CPU 1200, an internal memory 1210, a memory interface (I/F) 1220, a RAM 1230, a CCPU interface (I/F) 1240, a control interface (I/F) 1260, and a LSI 1270.

The application CPU 1110 acquires and executes application programs stored in the ROM 1130 or the RAM 1140 by controlling the memory I/F 1120. At this time, a part of application programs stored in the ROM 1130 is temporarily stored in the RAM 1140 and the application programs to be used are acquired from the RAM 1140 so as to execute applications. The ACPU I/F 1150 is connected to the CCPU I/F 1240 on the communication side to exchange data between the application side chip and the communication side chip under control of the application CPU 1110 or control from the CCPU I/F 1240. For example, mail data produced by a mail producing process is transferred to the communication side chip via the ACPU I/F 1150 and transmitted to the outside in a communication process by the communication CPU 1200.

The communication CPU 1200 carries out the communication operation by controlling the LSI 1270 via the control I/F 1260. At this time, the communication CPU 1200 writes and reads data and programs into and from the internal memory 1210 or the RAM 1230 by using a control signal. The memory I/F 1220 writes and reads data and programs into and from the RAM 1230 in accordance with a control signal sent from the communication CPU 1200 or the CCPU I/F 1240. The CCPU I/F 1240 controls data exchanges between the communication side chip and the application side chip in accordance with a control signal sent from the communication CPU 1200. The control I/F 1260 controls the LSI 1270 in accordance with a control signal sent from the communication CPU 1200, and transfers various kinds of data from the LSI 1270 to the communication CPU 1200. The LSI 1270 is an integrated circuit which includes a base band unit, a wireless unit and a power circuit or the like to execute communication processes.

With the aforementioned configuration, communication programs and intermittent operation programs stored in the ROM 1130 and the RAM 1140 on the application side are transferred to the RAM 1230 on the communication side at the start time or when a normal operation mode and an intermittent receiving mode are switched in the mobile communication terminal 1100. The communication CPU 1200 executes communication processes and intermittent receiving operation processes by accessing the RAM 1230 which stores these programs.

The communication CPU 1200 in the related art controls the RAM 1230 to store the programs for the intermittent operation at a time of the intermittent receiving operation and accesses the RAM 1230 to execute the intermittent receiving operation (i.e. an operation to repeat the wakeup mode and the sleep mode). Therefore, an access to the RAM 1230 during the intermittent receiving operation requires extra power consumption.

Moreover, since the communication programs and the programs for the intermittent operation are both stored in the RAM 1230 during the intermittent receiving operation, it is necessary to ensure that the RAM 1230 has a capacity to store at least both programs. That is, an increase in the capacity of the RAM 1230 causes a circuit area and manufacturing costs to be increased.

DISCLOSURE OF INVENTION

An object of the present invention is to provide a mobile communication terminal and a communication method in which consumed power can be reduced at the time of the intermittent receiving operation.

Another object of the present invention is to provide a mobile communication terminal with a small circuit area.

Yet another object of the present invention is to provide a mobile communication terminal and a communication method, in which storage unit required to perform the communication can be used efficiently.

The mobile communication terminal according to the present invention includes a RAM, an internal memory operable in a higher speed then the RAM, an arithmetic processing unit for performing a communication operation by using a communication program loaded in the RAM, an intermittent control unit, and a storage unit for storing an intermittent operation program. The intermittent control unit transfers the intermittent operation program stored in the storage unit to the internal memory in response to an intermittent operation start signal issued from the communication arithmetic processing unit. The communication arithmetic processing unit stops the communication operation when the transfer is completed and performs the intermittent reception operation by using the intermittent operation program stored in the internal memory.

More specifically, the communication arithmetic processing unit notifies data of a transfer destination of the intermittent operation program to the intermittent control unit at a time of the communication operation. The intermittent control unit stores the intermittent operation program in the transfer destination of the internal memory on the basis of the transfer destination data.

The intermittent operation program is transferred into the internal memory by the intermittent control unit as hardware in the mobile communication terminal according to the present invention, and the communication arithmetic processing unit for performs the intermittent reception operation by accessing only the internal memory. It is therefore unnecessary to access an external storage unit such as a RAM in the intermittent reception operation, which realizes lower power consumption.

Moreover, when the intermittent operation program is transferred, a program which is not used in the intermittent reception operation is preferably saved from the internal memory. That is, the intermittent control unit according to the present invention saves the program which is stored in the internal memory and not used in the intermittent reception operation into the RAM in response to the intermittent operation start signal sent from the communication arithmetic processing unit. Thereafter, the intermittent operation program stored in the storage unit is transferred to the internal memory. Accordingly, the internal memory may have a storage capacity which is enough to hold the intermittent operation program, whereby reduction of a storage capacity and a circuit area can be realized.

When the intermittent reception operation is ended to proceed to the normal communication operation, the communication arithmetic processing device issues an intermittent operation stop signal to the intermittent control unit, and the intermittent control unit preferably transfers the intermittent operation program stored in the internal memory to the storage unit in response to the intermittent operation stop signal. In the normal communication operation, the intermittent operation program can be thus saved in the storage unit.

It is also preferable that the intermittent control unit carries out a control such that power consumption of the RAM during the intermittent reception operation is lower than that at the time of the communication operation. The RAM according to the present invention is preferably made to suppress power consumption under control by the intermittent control unit because it is not used during the intermittent operation.

Furthermore, the intermittent operation program preferably includes a plurality of the intermittent operation program to be divided by conditions based on a communication environment state. At this time, the intermittent control unit transfers any of a plurality of intermittent operation programs from the storage unit to the internal memory in accordance with conditions based on a communication environment state, and the communication arithmetic processing device stops the communication operation in the completion of the program transfer and performs the intermittent reception operation by using the intermittent operation program in accordance with communication conditions within the internal memory. The intermittent operation programs divided based on communication conditions are stored in the internal memory, which allows a storage capacity to be further reduced.

The mobile communication terminal and the communication method according to the present invention make it possible to reduce consumed power at the time of the intermittent reception operation.

A circuit area can also be reduced in the intermittent control unit and a communication system of the mobile communication terminal mounted with the intermittent control unit.

It is further possible to reduce development costs of the intermittent control unit and the mobile communication terminal mounted with the intermittent reception device.

BEST MODE FOR CARRYING OUT THE INVENTION

Hereinafter, a mobile communication terminal according to the present invention will be described with reference to the attached drawings. Same or similar reference numerals are assigned to same or similar components in the drawings.
(Configuration of Mobile Communication Terminal)

Figure 1:
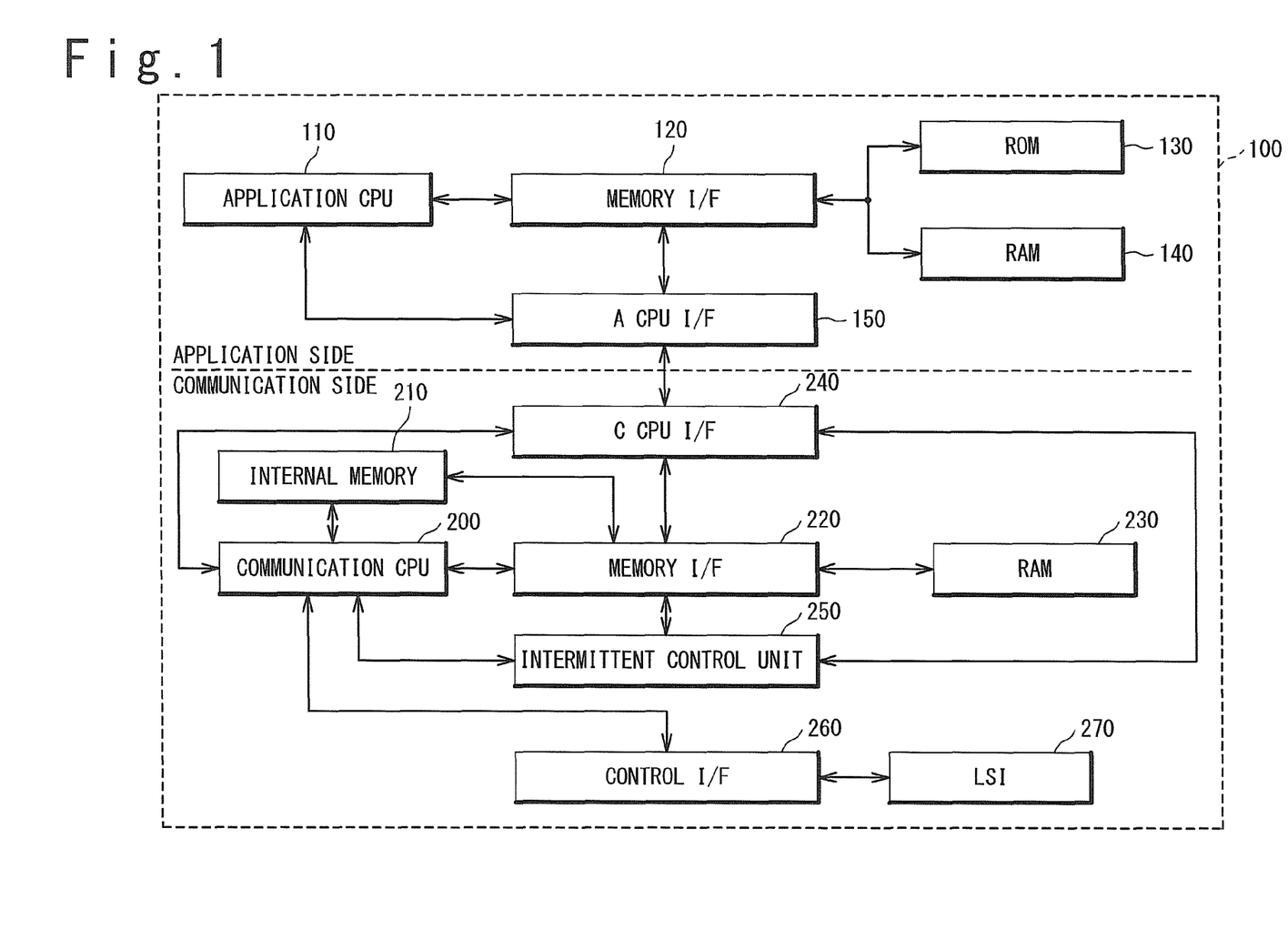
FIG. 1 is a block diagram showing a configuration of a mobile communication terminal according to an exemplary embodiment of the present invention.

FIG. 1 is a block diagram showing a configuration of a mobile communication terminal 100 according to an exemplary embodiment of the present invention. Referring to FIG. 1, a communication operation in a normal mode (to be referred to as a normal operation, hereinafter) and an intermittent receiving operation in an intermittent receiving mode (to be referred to as an intermittent operation, hereinafter) in the mobile communication terminal 100 according to the present invention will be described. Here, the normal operation is a normal communication operation to transmit and receive a radio signal to/from another communication terminal, and the intermittent operation is a communication operation to alternately repeat a wakeup mode in which a waiting state is maintained to receive the radio signal and a sleep mode in which a reception stop state is maintained.

The mobile communication terminal 100 according to the present invention includes an application side chip for executing various application processes other than communication processes, and a communication side chip for executing the communication processes. The application side chip is provided with an application CPU 110, a memory interface (I/F) 120, a ROM 130, a RAM 140, and an ACPU interface (I/F) 150. Also, the communication side chip is provided with a communication CPU 20, an internal memory 210, a memory interface (I/F) 220, a RAM 230, a CCPU interface (I/F) 240, an intermittent control unit 250, a control interface (I/F) 260, and a LSI 270.

The application CPU 110 is an arithmetic processing unit which controls operations other than communication such as a control operation of a camera and a LCD by controlling a memory I/F 120 and using an application program 1 stored in the ROM 130 or the RAM 140. The memory I/F 120 is an interface which controls read and write of programs and various kinds of data from and into the RAM 140 and the ROM 130 in accordance with a request (or a control signal) sent from the application CPU 110 or the ACPU I/F 150. The ACPU I/F 150 is an interface which is connected to the CCPU I/F 240 on the communication side and exchanges data between the application side and the communication side. In response to request (control signal) from the application CPU 110 or a request (or control signal) from the CCPU I/F 240, the ACPU I/F 150 also controls read and write of data and programs from and into the ROM 130 and the RAM 140 by controlling the memory I/F 120.

Figure 4:
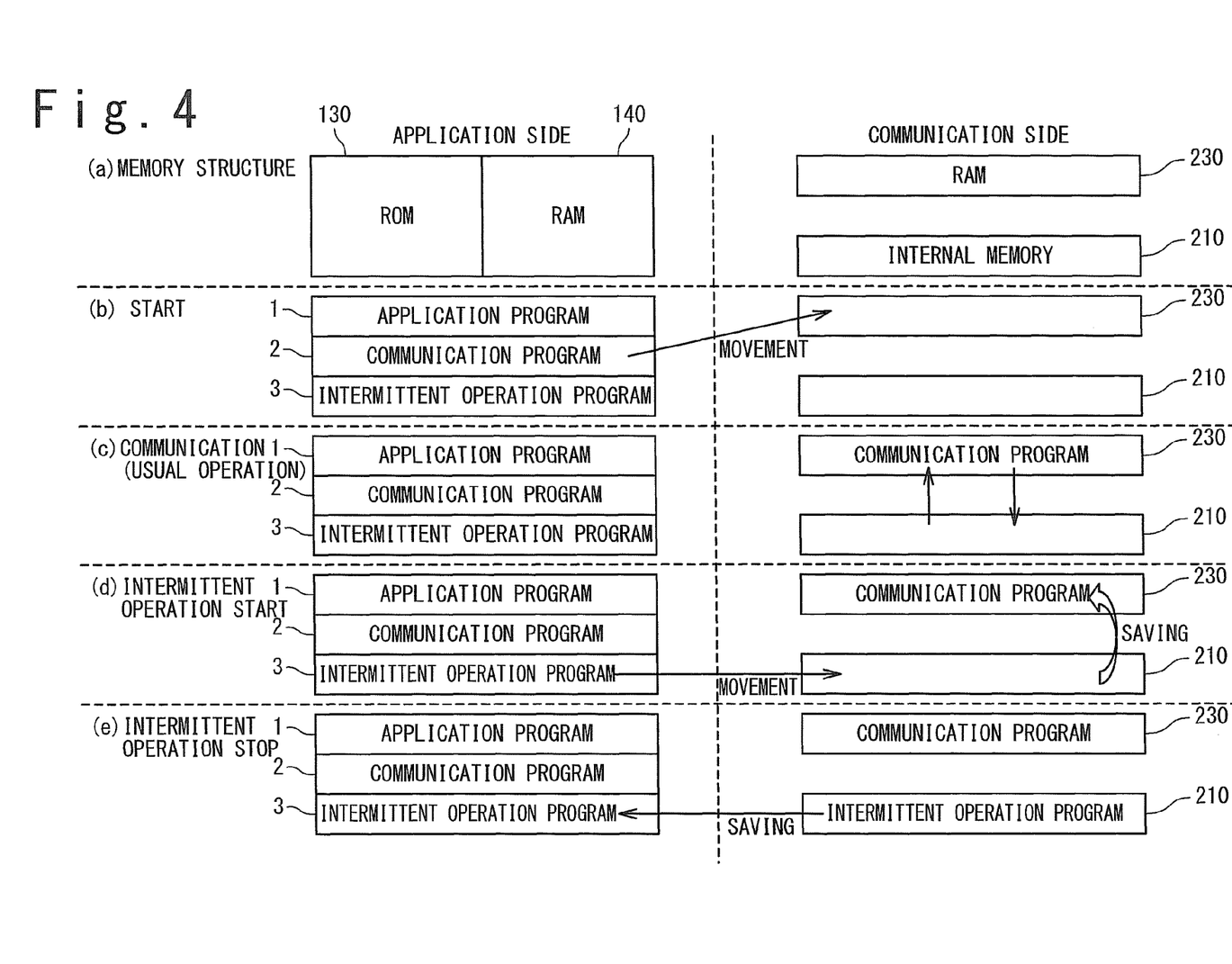
FIG. 4 is a conceptual diagram showing a program transition state in a series of operations of the start of the mobile communication terminal, a normal operation and an intermittent operation in the present invention.

Referring to FIG. 4 here, the application program 1, a communication program 2, and an intermittent operation program 3 are stored in the ROM 130 or the RAM 140. Here, the application program 1 is a program to execute respective functions including a camera function, a video image reproduction function, a processing function of various kinds of applications in JAVA (registered trademark), and an audio processing function other than the communication processes. The communication program 2 is a program to control the LSI 270 which executes a baseband process for realizing communication with a base station and other mobile communication terminals and a process of transmitting and receiving a radio signal. The intermittent operation program 3 is a program to perform the intermittent operation by controlling the LSI 270.

The communication CPU 200 is an arithmetic processing unit which performs the normal operation and the intermittent operation by controlling the LSI 270 via the control I/F 260. At this time, the communication CPU 200 carries out each operation by using a program stored in the internal memory 210 or the RAM 230 at the time of the normal operation and by using the program stored in the internal memory 210 at a time of the intermittent operation. The memory I/F 220 writes and reads data and a program into and from the RAM 230 and the internal memory 210 in accordance with a request (or control signal) sent from the communication CPU 200 or the CCPU I/F 240. The memory I/F 220 also transfers data and the program between the internal memory 210 and the RAM 230 in accordance with a control signal sent from the intermittent control unit 250. The memory I/F 220 further controls power supply to the RAM 230 in accordance with a request (or control signal) sent from the intermittent control unit 250.

The CCPU I/F 240 is an interface which exchanges data with the ACPU I/F 150 on the application side. The CCPU I/F 240 controls write and read of data and the program into and from the RAM 230 by controlling the memory I/F 220 in accordance with a request (or control signal) sent from the communication CPU 200, the intermittent control unit 250 and the ACPU I/F 150 and exchanges data between the communication side and the application side. The control I/F 260 is an interface which controls an operation of the LSI 270 in accordance with a control signal sent from the communication CPU 200 and controls transfer of various kinds of data between the LSI 270 and the communication CPU 200. The control I/F 260 also sets the LSI 270 to a low power consumption state in the intermittent operation by controlling the operation of the LSI 270 in accordance with a control signal sent from the communication CPU 200. The LSI 270 is an integrated circuit which includes a baseband section, a wireless section and a power supply circuit to execute communication processes.

The internal memory 210 is a storage unit attached to the communication CPU 200, and preferably uses an internal cache and TCM (tightly coupled memory). Accordingly, the internal memory 210 can be accessed at higher speed than the RAM 230 which is an external storage medium. The internal memory 210 according to the present invention is also used for the intermittent operation program 3 at the time of the intermittent operation, so that it should preferably have a capacity to store the intermittent operation program 3 at least.

Figure 2:
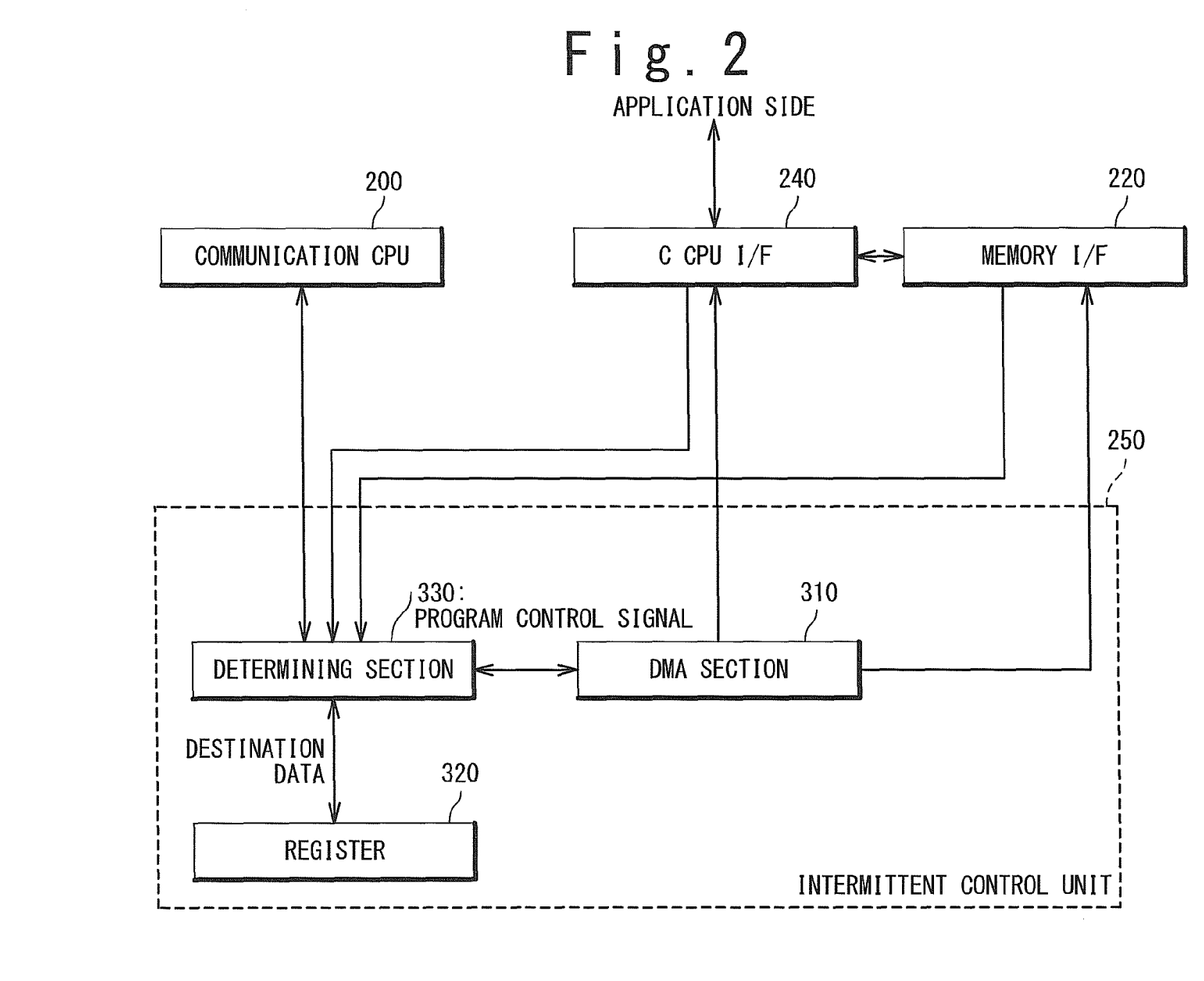
FIG. 2 is a block diagram showing a configuration of an intermittent control unit according to an exemplary embodiment of the present invention.

The intermittent control unit 250 controls the memory I/F 220 and the CCPU I/F 240 in accordance with a control signal sent from the communication CPU 200 and controls the start and stop of the intermittent operation and the transfer of the program for the intermittent operation or other programs. FIG. 2 is a block diagram showing the configuration of the intermittent control unit 250 according to the present invention. Referring to FIG. 2, the intermittent control unit 250 includes a determining section 300, a DMA (direct memory access) section 310 and a register section 320.

The determining section 300 analyses the control signal sent from the communication CPU 200, the memory I/F 220 and the CCPU I/F 240 and controls the memory I/F 220 and the DMA section 310 in accordance with an operation request included in the control signal, and sets data or instructions of transfer of programs to the register section 320. More specifically, the determining section 300 controls power consumption in the RAM 230 by controlling the memory I/F 220 in accordance with a control signal relating to operation mode switching and issued from the communication CPU 200. That is, the determining section 300 carries out a control so that power consumption of the RAM 230 at the time of the intermittent operation is lower than that at the time of the normal operation. The determining section 300 also sets address data of a transfer source and a transfer destination of programs and other data to the register section 320 on the basis of transfer destination data sent from the communication CPU 200. The determining section 300 further controls the DMA section 310 to execute a process of transferring the programs and data between the RAM 230 and the internal memory 210 or between the internal memory 210 and the application side. The determining section 300 also generates an execution completion signal to the communication CPU 200 in accordance with a transfer completion signal of data or the like sent from the CCPU interface (I/F) 240 and the memory I/F 220 to notify completion of a process relating to start or stop the intermittent operation.

The DMA section 310 controls the memory I/F 220 and the CCPU I/F 240 in accordance with a program transfer request signal sent from the determining section 300 to carry out direct data transfer between the internal memory 210 and the RAM 230 or between the internal memory 210 and the application side without intervention of the communication CPU 200. At this time, the program and the data are transferred by referring to address data of the transfer source and the transfer destination set in the register section 320.

The address data of the transfer source and the transfer destination for a program and data to be transferred at the time of the intermittent operation are registered in the register section 320 by the determining section 300 and read into the DMA section 310 via the determining section 300 when the program is transferred.

With the above configuration, the intermittent operation program 3 is stored in the internal memory 210 on the communication side when the operation of the mobile communication terminal 100 according to the present invention is switched from the normal operation to the intermittent operation. Accordingly, the communication CPU 200 can access the internal memory 210 to perform the intermittent operation. The intermittent operation programs 3 are also transferred to the ROM 130 and the RAM 140 on the application side in the switching from the normal operation to the intermittent operation. Accordingly, it is unnecessary to reserve a storage capacity for the intermittent operation program 3 in the storage unit on the communication side at the time of the normal operation. Especially, because the intermittent operation program 3 is not stored in the RAM 230, a storage capacity can be reduced.

It should be noted that the control signal for control among respective blocks and a data flow are not limited to a port control, a serial control, a serial transfer and a parallel transfer or the like. Moreover, well known interfaces can be used for the respective interfaces, and detailed description thereof will be omitted. Furthermore, since a baseband section, a wireless section and a power supply section included in the LSI 270 are also well known to those who are skilled in the art, detailed description thereof will be also omitted.

Referring to FIGS. 3 to 8, a series of operations such as a start operation, the normal operation and the intermittent operation in the mobile communication terminal 100 according to the exemplary embodiment of the present invention will be described.

Figure 3:
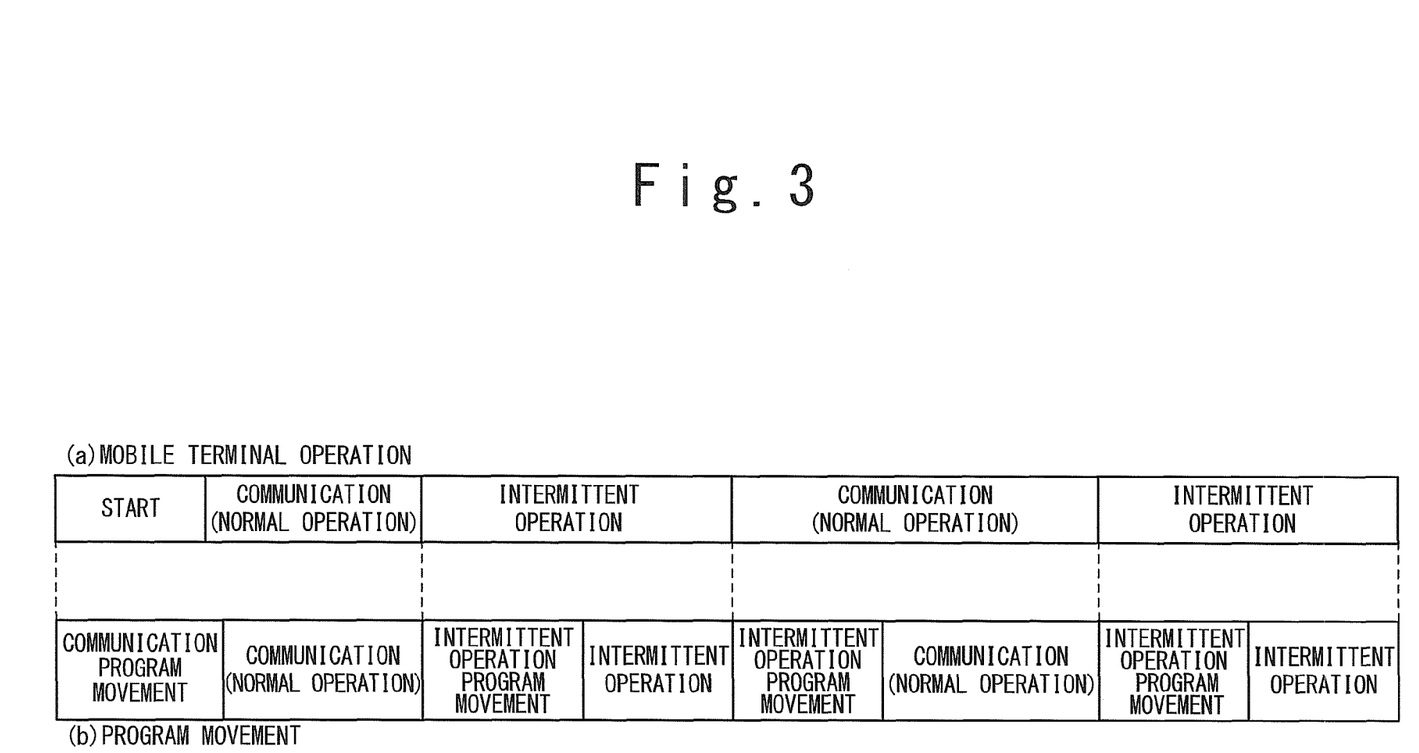
FIG. 3 is a timing chart showing a relationship between an operation of the mobile communication terminal and program transfer in the present invention.

FIG. 3 is a timing chart showing a program transition state ((b) of FIG. 3) corresponding to an operation transition state of the mobile communication terminal 100 ((a) of FIG. 3). Referring to FIG. 3, when the operation of the mobile communication terminal 100 is switched between an intermittent operation mode and a communication operation mode, programs are exchanged. Accordingly, the operation of the mobile communication terminal will be described below in detail at the start time, at a time of start of the intermittent operation, and at a time of start of the normal operation (i.e. end of the intermittent operation) when the mode is switched between the intermittent operation mode and the normal operation mode.

(Program Transition)

Referring to FIG. 4, program transition in the mobile communication terminal 100 according to the present invention will be described. (a) of FIG. 4 is a configuration diagram showing a configuration of the storage unit in the mobile communication terminal 100. Referring to (a) of FIG. 4, there are shown the ROM 130 and the RAM 140 on the application side, and the RAM 230 and the internal memory 210 on the communication side. (b) to (e) of FIG. 4 show programs to be stored in the storage unit on the application side and the communication side at the start time ((b) of FIG. 4), during the normal operation ((c) of FIG. 4), in the transition from the normal operation to the intermittent operation (or when the intermittent operation starts) ((d) of FIG. 4), and in the transition time from the intermittent operation to the normal operation (or when the intermittent operation stops) ((e) of FIG. 4). Frame lines indicating the storage unit in (a) of FIG. 4 correspond to frame lines in showing programs in (b) to (e) of FIG. 4.

Usually, all the programs used in the mobile communication terminal are stored in the ROM 130 and the RAM 140 on the application side. Referring to (b) of FIG. 4, when the mobile communication terminal 100 starts, the communication program 2 stored on the application side is transferred to the RAM 230 on the communication side.

Referring to (c) of FIG. 4, at the time of the normal operation, a communication process are executed while the processes are optimized by partially transferring the communication program 2 from the RAM 230 to the internal memory 210 in order to utilize high speed processing of the internal memory 210.

Referring to (d) of FIG. 4, unnecessary programs which has been stored in the internal memory 210 and are not used in the intermittent operation (to be referred to as a saved program 4) are saved into the RAM 230 when the intermittent operation starts. Then, the intermittent operation program 3 is transferred form the application side to the internal memory 210. During an intermittent operation period, the communication CPU 200 executes the intermittent operation program 3 stored in the internal memory 210 for the intermittent operation.

Referring to (e) of FIG. 4, when the intermittent operation is ended to shift to the normal operation, the intermittent operation program 3 stored in the internal memory 210 is saved into the ROM 130 and the RAM 130 on the application side so as to shift to the normal operation as shown in (c) of FIG. 4. When the intermittent operation is made to start next time, the saved program 4 is transferred from the internal memory 210 to the RAM 230 again as shown in (d) of FIG. 4 so as to transfer the intermittent operation program 3 from the ROM 130 and the RAM 140 on the application side to the internal memory 210.

Explained below will be an operation for transfer of the program at the start time, in the shift to the intermittent operation from the normal operation, and in the shift to the normal operation from the intermittent operation will be described below with reference to FIGS. 5 to 7.

(Program Transfer at the Start Time)

Figure 5:
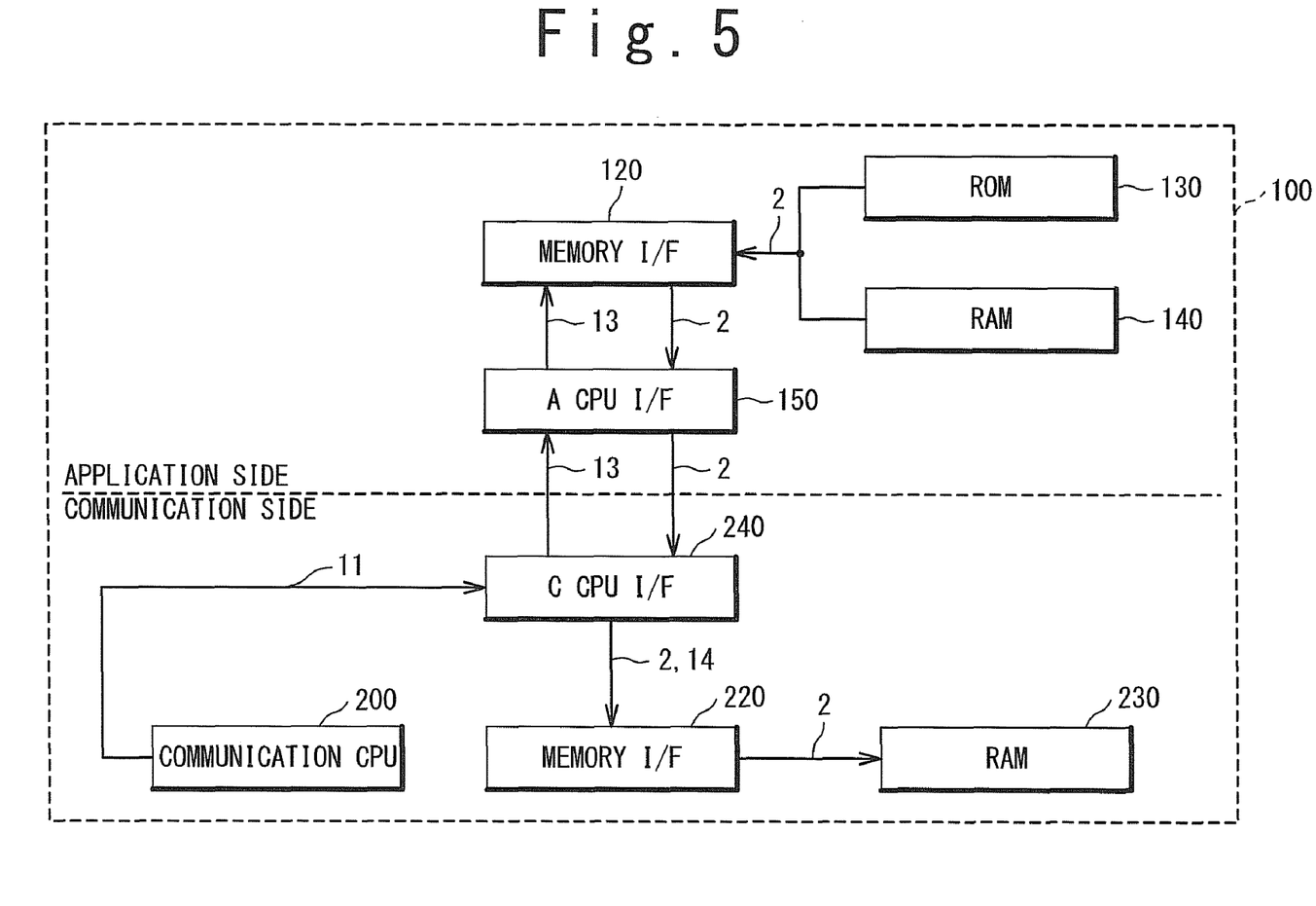
FIG. 5 is a block diagram showing a program transferring process when the mobile communication terminal according to the present invention starts.

FIG. 5 is a block diagram showing a program transfer operation at the start time in the mobile communication terminal 100. Referring to FIG. 5, the communication CPU 200 issues a transfer control signal 11 to the CCPU I/F 240 when the mobile communication terminal 100 starts. The transfer control signal 11 includes data to be used to transfer the communication program (e.g. program ID) and an address of the RAM 230 as a transfer destination and the like. The CCPU I/F 240 issues a transfer request 13 to the memory I/F 120 on the application side via the ACPU I/F 150 based on the transfer control signal 11. The memory I/F 120 acquires the communication program 2 from the ROM 130 and the RAM 140 based on the transfer request 13 and transfers the acquired program to the CCPU I/F 240 via the ACPU I/F 150. The CCPU I/F 240 transfers the transferred communication program 2 to the memory I/F 220 and issues a storage request 14 to the RAM 230. The memory I/F 220 stores the communication program 2 in a transfer destination address of the RAM 230 which is included in the storage request 14.

When a start operation of the mobile communication terminal 100 ends, the communication CPU 200 accesses the RAM 230 via the memory I/F 220 to perform the normal operation by using the communication program 2 stored in the RAM 230.

(Program Transfer in the Shift from the Normal Operation to the Intermittent Operation)

Figure 6:
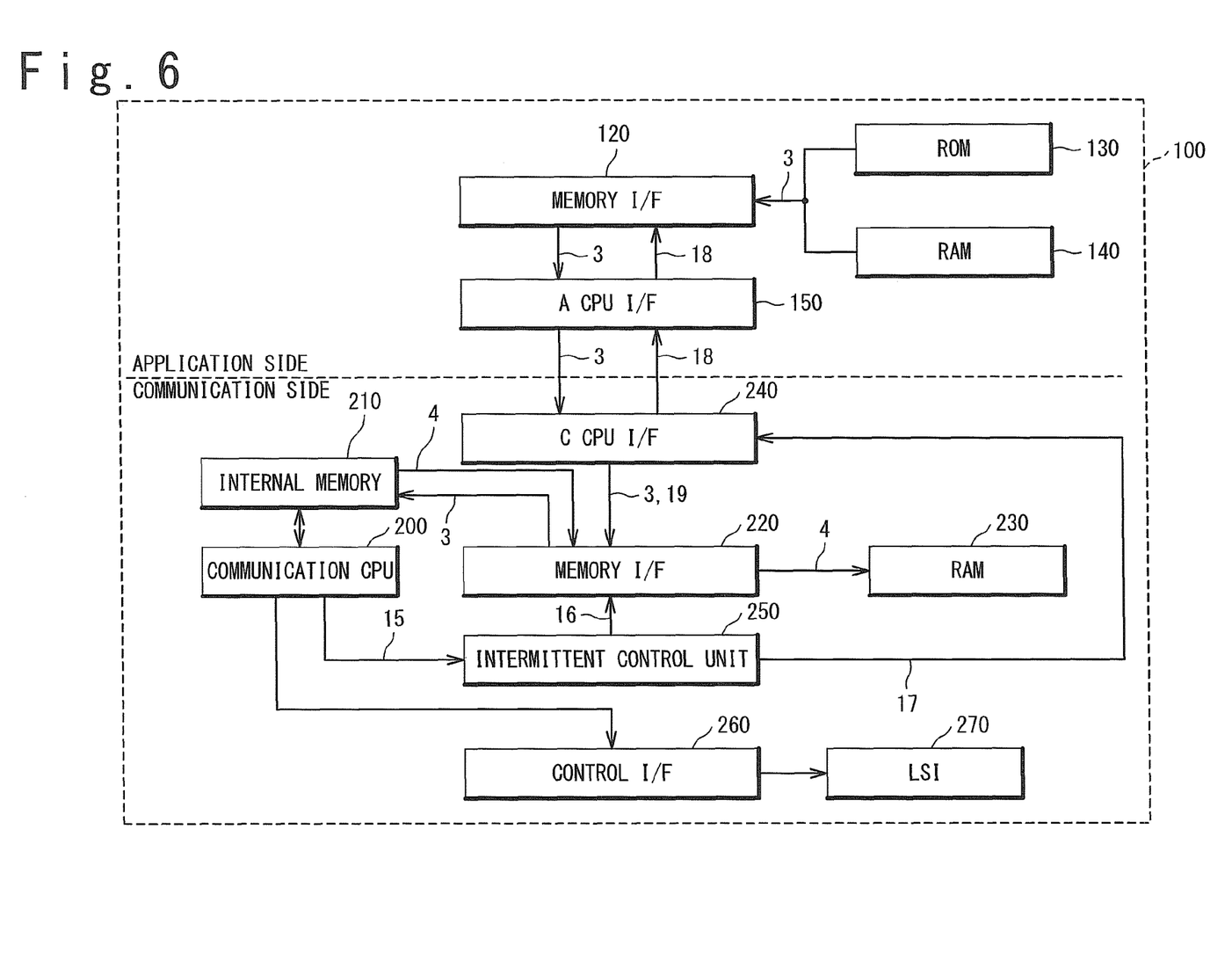
FIG. 6 is a block diagram showing a program transferring process in the transition from the normal operation to the intermittent operation in the mobile communication terminal according to the present invention.

FIG. 6 is a block diagram showing a program transfer operation when the mobile communication terminal ends the normal operation to start the intermittent operation. Referring to FIG. 6, a program transfer operation in the shift from the normal operation to the intermittent operation will be described. Here, the communication CPU 200 writes transfer destination data of the intermittent operation program 3 in the intermittent control unit 250 during the normal operation for preparation of transfer of the intermittent operation program 3.

The communication CPU 200 determines the start of the intermittent operation from communication environment data of the mobile communication terminal 100, and issues an intermittent operation start signal 15 to the intermittent control unit 250. The communication CPU 200 sets execution of the program stored in the internal memory 210 when a next operation starts after issuing the intermittent operation start signal 15, and makes the transition to a low power consumption state for reduction of consumed power.

The intermittent control unit 250 issues a save request signal 16 in response to the intermittent operation start signal 15 to control the memory I/F 220 such that the saved program 4 which is not used at a time of an intermittent reception operation is saved from the internal memory 210 to the RAM 230. The intermittent control unit 250 also controls the RAM 230 via the memory I/F 220 to be set to a low power consumption state.

When a save operation ends, the intermittent control unit 250 issues a transfer request signal 17 to the CCPU I/F 240 to request transfer of the intermittent operation program 3 which is used at a time of the intermittent reception operation to the application side. In response to the transfer request signal 17, the CCPU I/F 240 issues a transfer request 18 to the memory I/F 120 on the application side via the ACPU I/F 150. The memory I/F 120 acquires the intermittent operation program 3 from the ROM 130 and the RAM 140 in accordance with the transfer request 18 to transfer to the CCPU I/F 240 on the communication side via the ACPU I/F 150. The CCPU I/F 240 transfers the transferred intermittent operation program 3 to the memory I/F 220, and issues a storage request 19 to the internal memory 210. The memory I/F 220 stores the intermittent operation program 3 in a transfer destination address of the internal memory 210 contained in the storage request 19.

The communication CPU 200 is made to start the intermittent operation in accordance with expiration of a hardware timer (not shown). At this time, the communication CPU 200 controls the LSI 270 to perform the intermittent operation by accessing the internal memory 210 and using the intermittent operation program 3 stored in the internal memory 210.

As stated above, the mobile communication terminal 100 according to the present invention has the communication CPU 200 which accesses only the internal memory 210 during the intermittent operation without accessing the RAM 230. Therefore, power required to access the RAM 230 can be reduced. It is also possible to maintain a low power consumption state of the RAM 230 itself under control of the intermittent control unit 250, whereby power consumption can be further suppressed.

(Program Transfer in the Shift from the Intermittent Operation to the Normal Operation)

Figure 7:
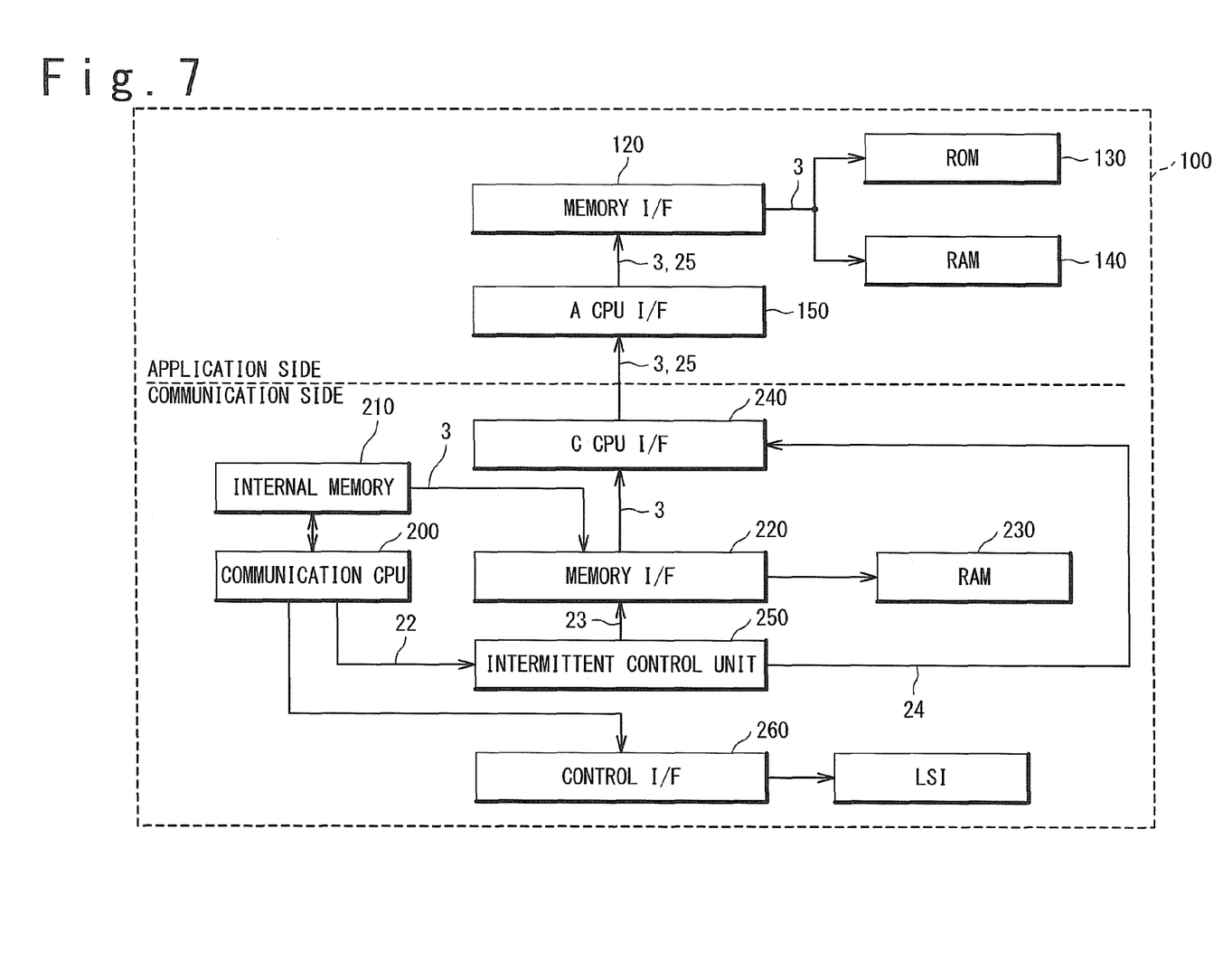
FIG. 7 is a block diagram showing a program transferring process in the transition from the intermittent operation to the normal operation in the mobile communication terminal according to the present invention.
Figure 8:
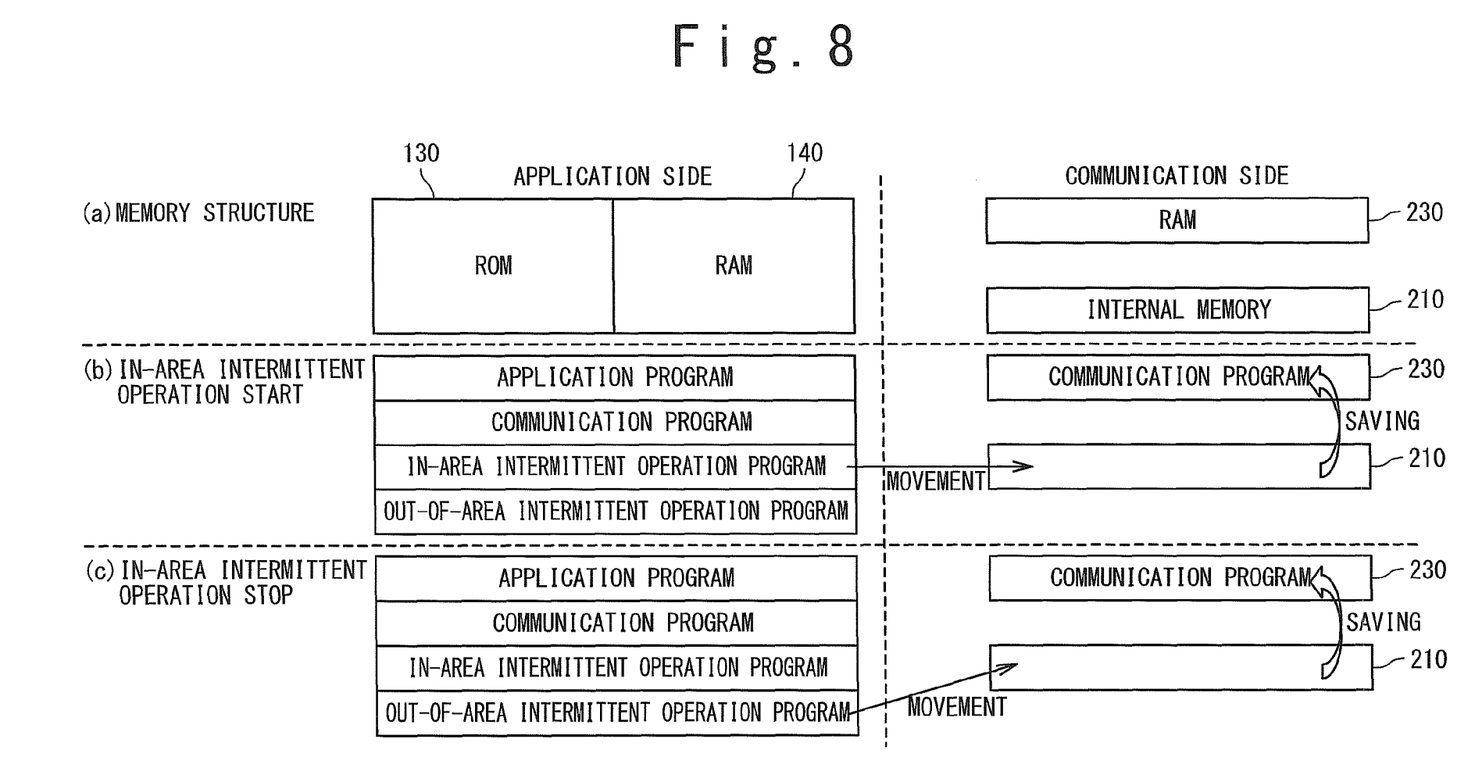
FIG. 8 is a conceptual diagram showing a program transferring process when an intermittent program according to the present invention is divided.

FIG. 7 is a block diagram showing a program transfer operation when the mobile communication terminal ends the intermittent operation to start the normal operation. Referring to FIG. 7, a program transferring operation in the transition from the intermittent operation to the normal operation will be described. It is assumed here that the communication CPU 200 controls the intermittent control unit 250 to store data such as a transfer destination of the intermittent operation program 3 for preparation of transfer of the intermittent operation program 3.

The communication CPU 200 determines the start of the normal operation from communication environment data of the mobile communication terminal 100 and issues an intermittent operation stop signal 22 to the intermittent control unit 250. The communication CPU 200 sets an execution of the program from the internal memory 210 and the RAM 230 when a next operation starts after issuing the intermittent operation stop signal 22, and makes the transition to a normal power consumption state.

The intermittent control unit 250 controls the memory I/F 220 by issuing a save request signal 23 in response to the intermittent operation stop signal 22 to extract the intermittent operation program 3 from the internal memory 210 and transfer the program to the CCPU I/F 240. The intermittent control unit 250 also issues a transfer request signal 24 containing transfer destination data to transfer the intermittent operation program 3 received from the memory I/F 220 to the application side. The intermittent control unit 250 further controls the RAM 230 via the memory I/F 220 to cancel a power consumption state and set a normal state.

The CCPU I/F 240 transfers the intermittent operation program 3 to the memory I/F 120 on the application side via the ACPU I/F 150 in response to the transfer request signal 24, and issues a storage request 25. The memory I/F 120 controls the ROM 130 and the RAM 140 to store the intermittent operation program 3 in accordance with the storage request 25.

When a save operation ends, the intermittent control unit 250 notifies to the communication CPU 200 that the communication operation can be started. The communication CPU 200 starts the normal operation in accordance with the notification of save operation completion. At this time, the communication CPU 200 accesses the RAM 230 to use the communication program 2 stored therein and performs the normal operation by controlling the LSI 270. The intermittent control unit 250 also controls the RAM 230 via the memory I/F 220 to set a power consumption state of the RAM 230 to a normal state.

The mobile communication terminal 100 according to the present invention thus controls the storage unit on the application side to store the intermittent program 3 at a normal time, and controls the internal memory 210 to store the program at the time of the intermittent operation. It is therefore unnecessary for the RAM 230 on the communication side to store the intermittent operation program 3. Accordingly, reduction of a storage capacity of the RAM 230 allows reduction of a circuit area on the communication side, or a storage capacity of the RAM 230 can be efficiently used.

In the mobile communication terminal 100 with the aforementioned configuration, the intermittent operation program 3, which is used in accordance with communication environments at the time of the intermittent operation, can be divided into small blocks and exchanged in units of blocks. More specifically, referring to FIG. 8, the program is divided into an in-area intermittent operation program, which is used when the mobile communication terminal is within a service area such that an environment is provided to use services by receiving a radio wave, and an out-of-area intermittent operation program, which is used when it is outside the service area without reception of radio wave, and stored in the ROM 130 or the RAM 140 on the application side. Only the in-area intermittent operation program is transferred to the internal memory 210 on the communication side when the mobile communication terminal is within the service area during the intermittent operation (refer to (b) of FIG. 8), while only the out-of-area intermittent operation program is transferred to the internal memory 210 when it is outside the service area (refer to (c) of FIG. 8), so that an intermittent operation corresponding to respective communication environments is carried out. The capacity of the internal memory 210 can be reduced furthermore if the intermittent operation program 3 used at the time of the intermittent operation can be divided into smaller units in accordance with communication environments. Therefore, the mobile communication terminal 100 according to the present invention is allowed to have a reduced circuit area in the RAM 230 and the internal memory 210 on the communication side, whereby development costs can be reduced.

Although the exemplary embodiment of the present invention has been described above in detail, a specific configuration of the present invention is not limited to the aforementioned exemplary embodiment and any modifications made without departing from the scope of the present invention can also be included in the present invention. The present exemplary embodiments have been presented by using the mobile communication terminal mounted with twin CPUs as an example. However, if an external storage unit for storing the intermittent operation program 3 is provided, an exemplary embodiment may also be presented such that the intermittent operation program is transferred from the external storage unit to the internal memory 210 at the time of the intermittent operation and saved in the external storage unit at the time of the normal operation.

The invention claimed is:

1. A mobile communication terminal comprising an application section and a communication section,
wherein said application section comprises a storage unit in which a communication program and an intermittent operation program are stored,
wherein said communication section comprises:
a RAM;
an internal memory which has a higher operation speed than that of said RAM;
a communication processor configured to perform a communication operation by using a communication program loaded in said RAM; and
an intermittent control unit,
wherein said intermittent control unit moves the intermittent operation program stored in said storage unit to said internal memory in response to an intermittent operation start signal issued from said communication processor, and
wherein when the move is completed, said communication processor stops said communication operation that has been running and performs an intermission reception operation by using the intermittent operation program in said internal memory.

2. The mobile communication terminal according to claim 1, wherein said intermittent control unit moves programs which are stored in said internal memory and not used for the intermittent operation to said RAM in response to intermittent operation start signal from said communication processor and then moves the intermittent operation program stored in said storage unit to said internal memory.

3. The mobile communication terminal according to claim 1, wherein said communication processor notifies data of a destination of the intermittent operation program to said intermittent control unit in case of the communication operation, and wherein said intermittent control unit stores the intermittent operation program in the destination of said internal memory based on the destination data.

4. The mobile communication terminal according to claim 1, wherein when an operation is switched from the intermission reception operation to the communication operation, said communication processor issues an intermittent operation stop signal to said intermittent control unit, and
wherein said intermittent control unit moves the intermittent operation program in said internal memory to said storage unit in response to the intermittent operation stop signal.

5. The mobile communication terminal according to claim 1, wherein said intermittent control unit performs a control such that a consumed power amount of said RAM in the intermission reception operation is lower than a consumed power amount in the communication operation.

6. The mobile communication terminal according to claim 1, wherein the intermittent operation program contains a plurality of intermittent operation programs which are divided based on a communication environment condition,
   wherein said intermittent control unit moves any of the plurality of intermittent operation programs from said storage unit to said internal memory according to the communication environment condition, and
   wherein when the movement is completed, said communication processor stops the communication operation and performs the intermittent reception operation by using the intermittent operation program in said internal memory.

7. The mobile communication terminal according to claim 1, wherein said application section further comprises an application processor configured to execute an operation other than the communication operation by using the application program,
   wherein the application program is further stored in said storage unit, wherein said intermittent control unit in response to the intermittent operation start signal from said communication processor and moves the intermittent operation program stored in said storage unit to said internal memory,
   wherein when the movement is completed, said communication processor stops the communication operation and executes the intermission reception operation by using the intermittent operation program in said internal memory.

8. A communication method in a mobile communication terminal which comprises an application section and a communication section, wherein said application section comprises a storage unit which stores a communication program and an intermittent operation program, wherein said communication section comprises a RAM;
   an internal memory operating in a higher operation speed than that of said RAM;
   a communication processor configured to execute a communication operation by using a communication program loaded in said RAM; and
   an intermittent control unit,
   said communication method comprising:
   issuing intermittent operation start signal from said communication processor which is executing the communication operation by using the communication program loaded into said RAM;
   moving the intermittent operation program from said storage unit to said internal memory by said intermittent control unit in response to said intermittent operation start signal;
   stopping the communication operation that has been running by said communication processor when the moving is completed;
   accessing to said internal memory in the higher operation speed than that of said RAM to execute an intermission reception operation by using the intermittent operation program in said internal memory.

9. The communication method according to claim 8, wherein said moving comprises: saving programs which are in said internal memory and which are not used for the intermission reception operation, in said RAM by said intermittent control unit in response to the intermittent operation start signal issued from said communication processor.

10. The communication method according to claim 8, wherein said moving comprises: notifying data of a destination of the intermittent operation program from said communication processor to said intermittent control unit on the communication operation; and said intermittent control unit storing the intermittent operation program in the destination of said internal memory based on the destination data.

11. The communication method according to claim 8, further comprising: issuing an intermittent operation stop signal to said intermittent control unit from said communication processor when the operation is switched from the intermittent reception operation to the communication operation; and moving the intermittent operation program from said internal memory to said storage unit by said intermittent control unit in response to the intermittent operation stop signal.

12. The communication method according to claim 8, further comprising:
   executing a control by said intermittent control unit such that a consumed power amount of said RAM in the intermission reception operation is lower than that of said RAM in the communication operation.

* * * * *